(12) United States Patent
Mizuno et al.

(10) Patent No.: US 7,052,401 B2
(45) Date of Patent: May 30, 2006

(54) SEALING STRUCTURE FOR CROSS SHAFT

(75) Inventors: Kouichirou Mizuno, Kashiwara (JP); Kei Fujii, Sakai (JP)

(73) Assignee: Koyo Seiko Co., Ltd., Osaka (JP)

( * ) Notice: Subject to any disclaimer, the term of this patent is extended or adjusted under 35 U.S.C. 154(b) by 126 days.

(21) Appl. No.: 10/477,428

(22) PCT Filed: Jun. 3, 2003

(86) PCT No.: PCT/JP03/07049

§ 371 (c)(1),
(2), (4) Date: Nov. 13, 2003

(87) PCT Pub. No.: WO03/102435

PCT Pub. Date: Dec. 11, 2003

(65) Prior Publication Data

US 2004/0166947 A1    Aug. 26, 2004

(30) Foreign Application Priority Data

Jun. 3, 2002    (JP) .............................. 2002-161830

(51) Int. Cl.
*F16D 3/40* (2006.01)
(52) U.S. Cl. ...................... 464/131; 464/133
(58) Field of Classification Search .................. 464/14, 464/131, 133, 136; 277/349, 551, 562; 74/492
See application file for complete search history.

(56) References Cited

U.S. PATENT DOCUMENTS

| 2,903,868 | A | * | 9/1959 | Stillwagon, Jr. ............. 464/14 |
| 3,777,510 | A |   | 12/1973 | McElwain |
| 4,283,063 | A | * | 8/1981 | Prescott ................... 277/551 X |
| 4,512,672 | A |   | 4/1985 | Olschewski et al. |
| 5,326,322 | A | * | 7/1994 | Fechter ................... 464/136 X |
| 6,073,933 | A | * | 6/2000 | Johnston |

FOREIGN PATENT DOCUMENTS

JP    9-151956    6/1997

OTHER PUBLICATIONS

Notification of the Recording of a Change (Form PCT/IP/306) issued for PCT/JP03/07049 (Mar. 1994).

* cited by examiner

*Primary Examiner*—Greg Binda
(74) *Attorney, Agent, or Firm*—Smith, Gambrell & Russell, LLP

(57) ABSTRACT

A seal 5 free from a core bar is fitted on each of a vertical shaft 1v and a horizontal shaft 1h of a cross shaft 1. Bases 5c of adjoining seals 5 are pressed against each other in back-to-back contact.

3 Claims, 4 Drawing Sheets

SEALING STRUCTURE FOR CROSS SHAFT

TECHNICAL FIELD

The present invention relates to a seal for use with a cross shaft used as a cross joint.

BACKGROUND ART

FIG. 4 is a sectional view showing a conventional sealing structure for cross shaft (spider). The figure shows only a quarter (a second quadrant) of a cross shaft 1. The shaft 1 is employed by, for example, an automotive steering shaft and used under an environment exposed to water and mud spattered from a road surface. Referring to the figure, a vertical shaft 1v and a horizontal shaft 1h constituting the cross shaft 1 are each assembled with a cup-shaped outer ring 3 allowed to rotate by needle-like rollers 2. A ring-like seal 4 having a core bar 4a is fitted on a respective root portion of the vertical shaft 1v and the horizontal shaft 1h. The reason for using the seal 4 with the core bar is to establish a tight fit relation with the cross shaft 1 in order to ensure mud/water tightness of the seal. The adjoining core bars 4a are so arranged as to define a gap even between their portions in closest proximity to each other.

Because of the inclusion of the core bar, the seal 4 employed by the conventional sealing structure for cross shaft as described above is more expensive than a seal free from a core bar. However, the seal obviating the core bar for cost down is decreased in fastness to the cross shaft 1, so that the seal is liable to rotate in conjunction with the rotation of the outer ring 3. In this occasion, the seal suffers heavy wear at its base (a portion in contact with the cross shaft 1). As a result, the muddy water detrimentally enters through clearance between the base of the seal and the cross shaft 1.

In view of the foregoing problem encountered by the conventional art, it is an object of the present invention to provide a sealing structure for cross shaft which is not decreased in the mud/water tightness despite the omission of the core bar.

SUMMARY OF THE INVENTION

A sealing structure for cross shaft according to the invention comprises:

a ring-like seal for first shaft assembled on a first shaft of a cross shaft and including a lip portion in sliding contact with a rotary ring, and a base for supporting the lip portion; and a ring-like seal for second shaft assembled on a second shaft of the cross shaft and including a lip portion in sliding contact with a rotary ring, and a base supporting the lip portion, the seal for second shaft cooperating with the seal for first shaft to form an intersection, at which the bases of these seals are in contact with each other to thereby circumferentially lock the seals to each other.

According to the sealing structure for cross shaft of the above arrangement, the seals are circumferentially locked to each other with their bases contacting with each other. Because of the nature of the cross shaft, rotary rings in opposing relation are rotated in the same direction while a seal receives torques of the opposite directions from two adjoining seals. Thus, the rotation of the seal is inhibited. Hence, the sealing structure can prevent wear at the bases of the seals in spite of the use of the seals free from the core bar. Accordingly, there is provided a sealing structure for cross shaft which is not decreased in the mud/water tightness and which accomplishes cost down by obviating the core bars.

In the above sealing structure for cross shaft, the seals for first and second shaft are each formed from a rubber-like material or resin alone and may each include a relief groove for deformation caused by contact pressure, the groove being formed in the vicinity of place where the bases of the seals contact with each other. In this case, elastic deformation caused by the bases of the seals pressed against each other does not affect the lip portions, because the deformation is accommodated by the deformed relief grooves. Hence, the lip portions may be maintained to have a proper contact pressure on the rotary rings.

In the above sealing structure for cross shaft, the bases of the seals are pressed against each other in back-to-back contact and may be formed with knurls at their contact surfaces thereof. In this case, a sufficient frictional force is produced because the bases are pressed against each other in back-to-back contact and besides, are formed with the knurls at their contact surfaces. This ensures that the rotation of the seals is assuredly inhibited.

BEST MODE FOR CARRYING OUT THE INVENTION

Figure 1:
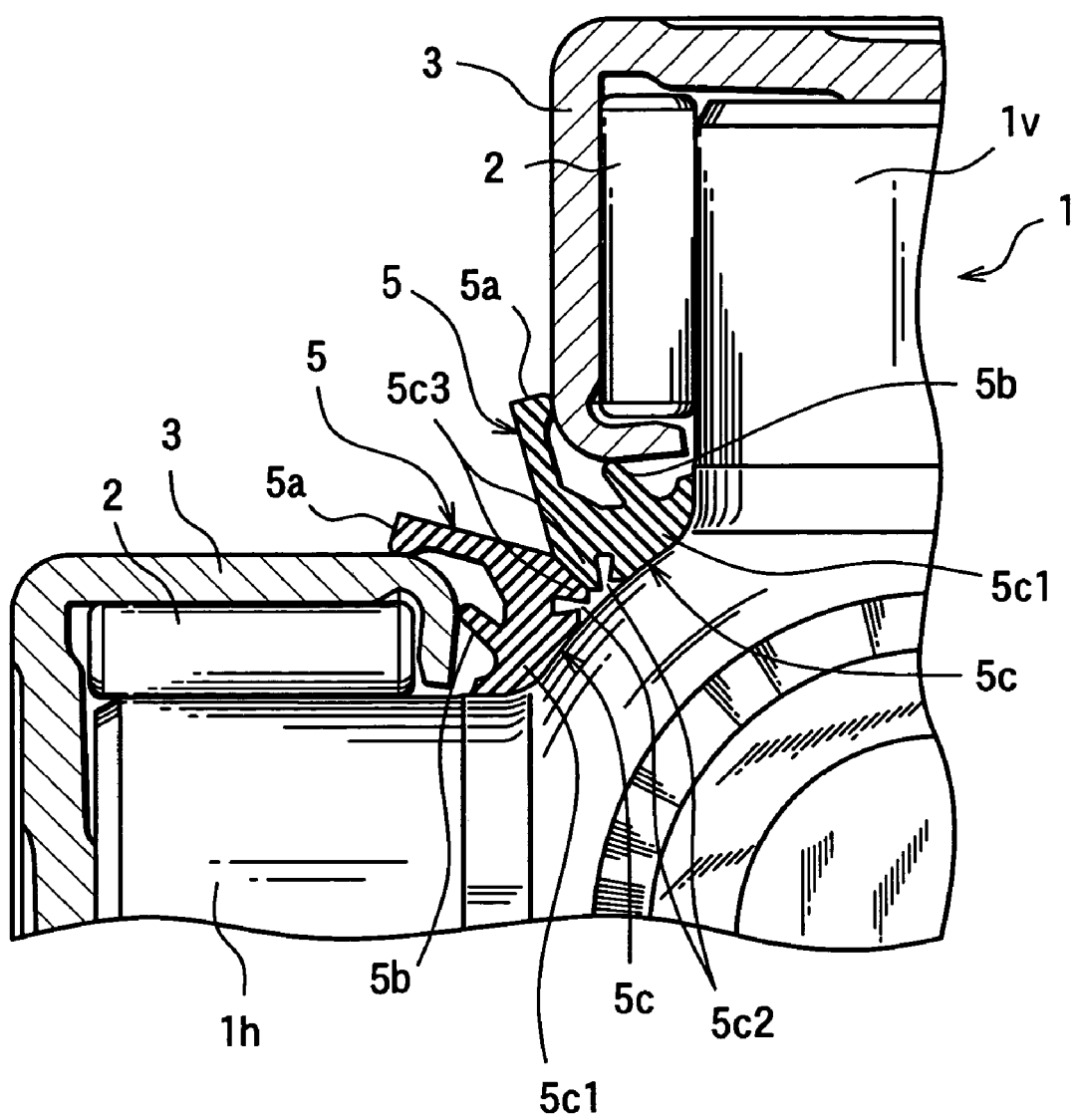
FIG. 1 is a sectional view showing a sealing structure for cross shaft according to an embodiment of the present invention.

FIG. 1 is a sectional view showing a sealing structure for cross shaft according to a first embodiment of the present invention. The figure shows only a quarter (a second quadrant) of a cross shaft (spider). The cross shaft 1 is employed by, for example, an automotive steering shaft and used under an environment exposed to water and mud spattered from road surface. Referring to the figure, a vertical shaft 1v and a horizontal shaft 1h 90 degrees shifted in phase constitute the cross shaft 1. The vertical and horizontal shafts are each assembled with a cup-shaped outer ring 3 allowed to rotate by needle-like rollers 2.

Figure 2:
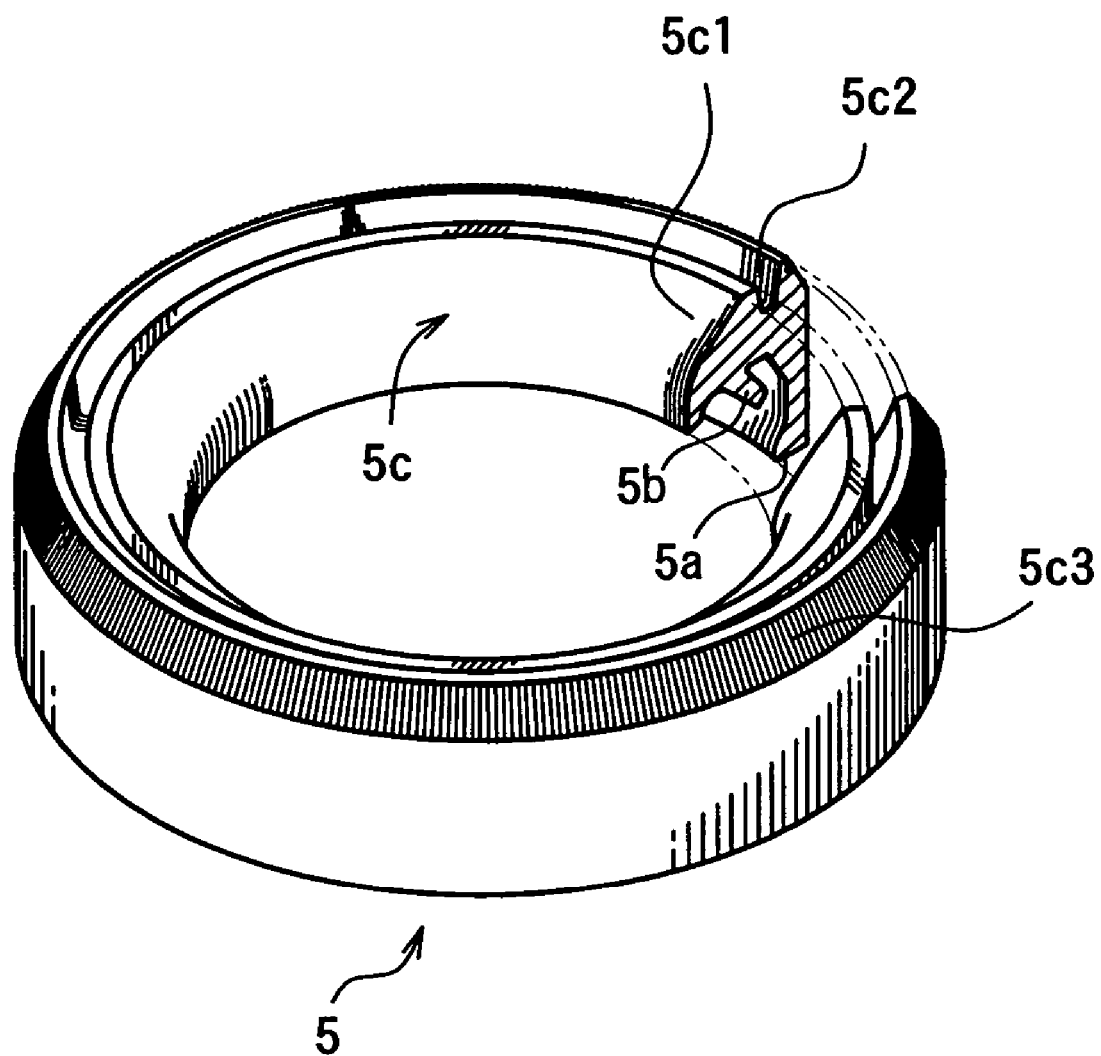
FIG. 2 is a perspective view showing a single body of the seal shown in FIG. 1.

A ring-like seal 5 formed from rubber (or an equivalent rubber-like material) or from a resin is fitted on a respective root portion of the vertical shaft 1v and the horizontal shaft 1h. FIG. 2 is a perspective view showing a single body of the seal 5. Referring to FIG. 1 and FIG. 2, the seal 5 includes lip portions 5a, 5b in contact with the outer ring (rotary ring) 3, and a base 5c supporting these lip portions. According to a specific functional definition, the base 5c includes a fitting portion 5c1 in contact with the cross shaft 1, a circumferential groove 5c2 having a U-shaped section, and an abutment portion 5c3 at which the seals abut against each other.

Assuming a side where the lip portions 5a, 5b are formed as a front side of the seal 5, the abutment portion 5c3 is located on the rear side. As fitted on the cross shaft 1, a pair of seals 5 for the vertical shaft 1v and the horizontal shaft 1h form an intersection at positions shown in FIG. 1. The seals 5 are pressed against each other in back-to-back contact at their abutment portions 5c3. Therefore, the seals can produce a certain frictional force at the contact surfaces thereof. The certain frictional force means a frictional force of such a magnitude as to resist a torque of the outer ring 3 to be described hereinlater. As shown in FIG. 2, the abutment portion 5c3 is formed with knurls. The seals 5 have their abutment portions 5c3 with the knurls pressed against each other. Therefore, the contact surfaces of the seals have such a great friction coefficient that a sufficient frictional force is produced.

In the meantime, elastic deformation is caused by the abutment portions 5c3 pressed against each other. However, the circumferential grooves 5c2 positively accommodate to the elastic deformation by changing their form in section. That is, the circumferential grooves 5c2 serve as relief grooves for the deformation caused by the contact pressure between the abutment portions 5c3. Hence, the elastic deformation caused by the abutment portions 5c3 pressed against each other does not affect the lip portions 5a, 5b, so that the lip portions 5a, 5b are maintained to have a proper contact pressure on the outer ring 3.

Figure 3:
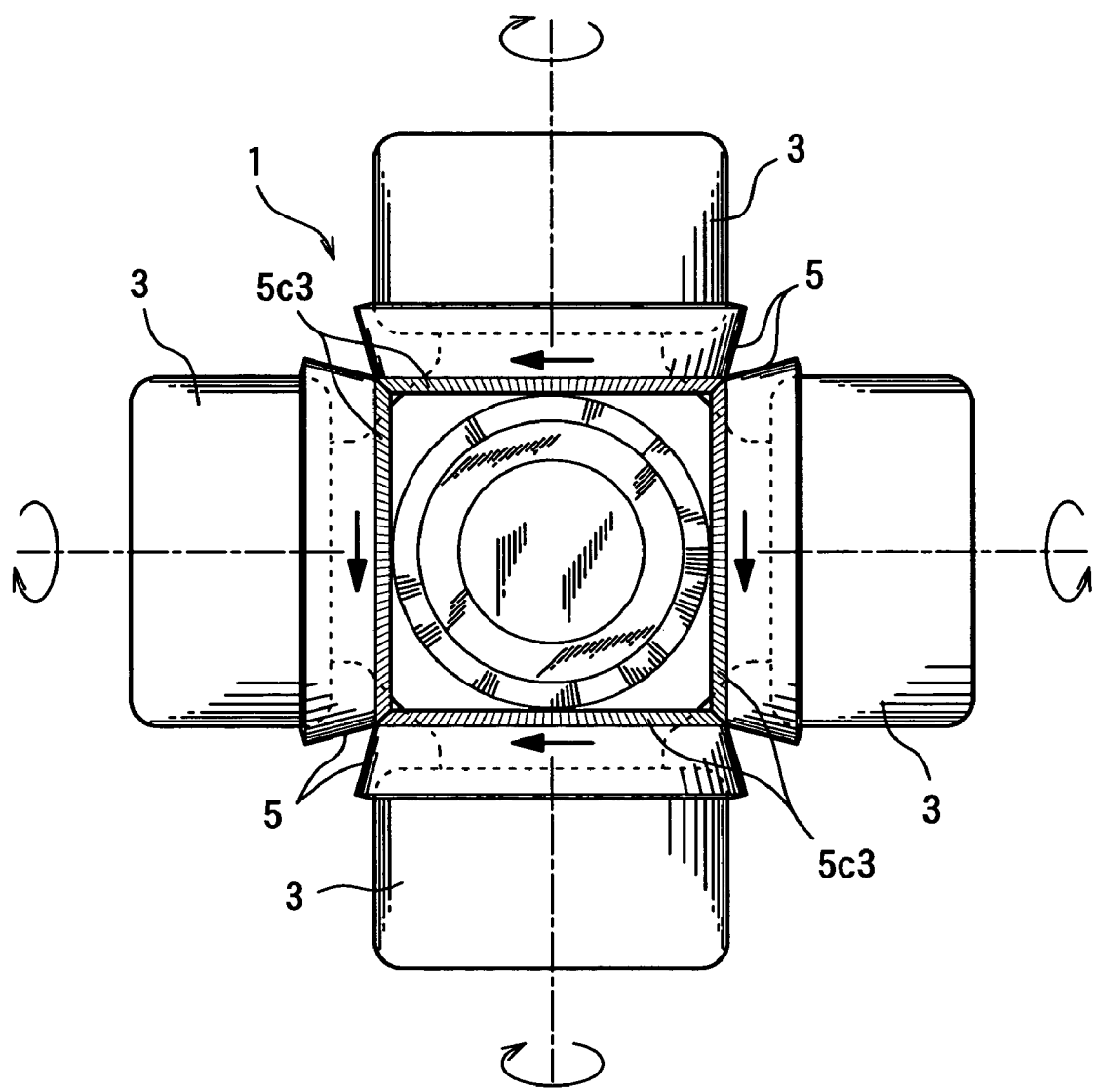
FIG. 3 is a front view showing a configuration of the whole body of the cross shaft with the seals fitted thereon.
Figure 4:
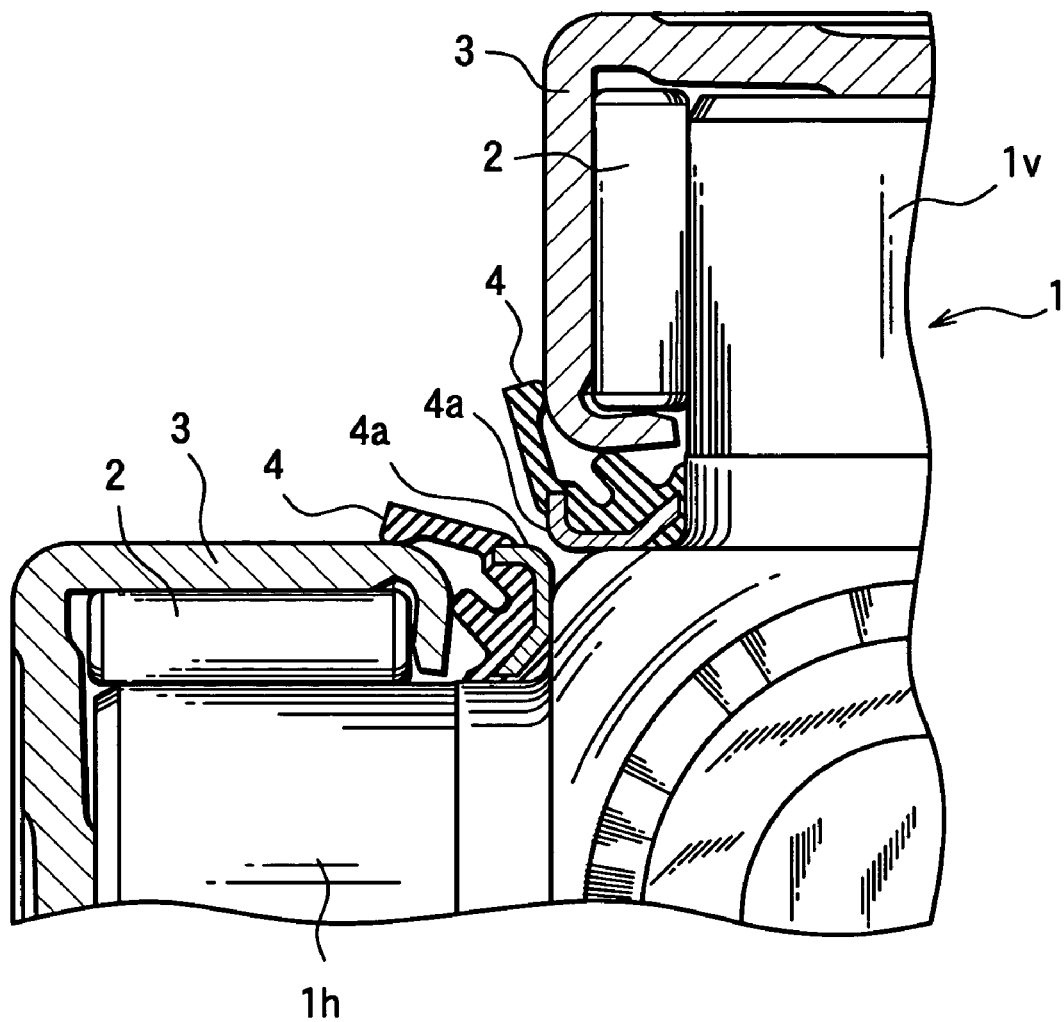
FIG. 4 is a sectional view showing a cross shaft adopting the conventional sealing structure.

FIG. 3 is a front view showing a configuration of the whole body of the cross shaft 1 with the seals 5 fitted thereon in the aforementioned manner. When the cross shaft 1 transmits power from one shaft to another in a clockwise or counter-clockwise direction, a lateral pair of outer rings 3 on the horizontal shafts are rotated in one same direction while a vertical pair of outer rings 3 on the vertical shafts are also rotated in one same direction, as shown in the figure. The seal 5 receives, from two adjoining seals, torques of an equal value but of the opposite directions as viewed from the respective intersections and besides, is subjected to the sufficient frictional force produced at its abutment portion 5c3 pressed against the abutment portions of the adjoining seals. Thus, the seal 5 is inhibited from rotating. In addition, the knurls are formed at the abutment portion 5c3 so as to prevent the occurrence of slippage. Therefore, the rotation of the seal 5 is assuredly inhibited.

As described above, the four seals 5 inhibit one another from rotating without reliance upon the fastness to the cross shaft 1 via the fitting portions 5c1 thereof. Consequently, the seal 5 is prevented from suffering wear associated with its sliding movement against the cross shaft 1. That is, there is provided the sealing structure for cross shaft which is not decreased in the mud/water tightness, although the core bar is obviated for cost down.

It is noted that the sectional form of the above seal may be varied in various ways as required. As to the abutment portion 5c3 of the seal 5, for instance, the above embodiment is arranged such that the seals 5 are locked to each other by way of the frictional force produced by pressing against each other at their abutment portions 5c3. In an alternative arrangement, the abutment portions may be configured to mesh with each other in a gear-like fashion. Also, according to the above embodiment, the seal is formed with the circumferential groove 5c2. However, the circumferential groove may be replaced by non-continuous grooves arranged along the circumferential direction of the seal (provided only at necessary places).

The material for the above seal 5 may be a material having a flexibility suited for the seal and a strength of a degree to permit the transmission of the torque between the seals. Examples of a usable rubber-base material include NBR, super-nitrile rubber, acrylic rubber and the like. Examples of a usable resin-base material include polyacetal resin, polyamide resin and the like.

The invention claimed is:

1. A sealing structure for a cross shaft comprising:
   a ring shaped first seal assembled on a first shaft of a cross shaft, the first seal including a lip portion in contact with a rotary ring mounted to the first shaft, and a base for supporting the lip portion and having a relief groove for accommodating elastic deformation caused by contact pressure; and
   a ring shaped second seal assembled on a second shaft of said cross shaft independently from said first seal, the second seal including a lip portion in contact with a rotary ring mounted to the second shaft, and a base for supporting the lip portion of the second seal and having a relief groove for accommodating elastic deformation caused by contact pressure, thereby having substantially the same shape as said first seal, the second seal cooperating with said first seal to form an intersection, at which the bases of these seals are in contact with each other to thereby circumferentially lock the seals to each other, wherein each of said grooves is formed in the vicinity of the place where said bases of the seals are in contact with each other.

2. The sealing structure for a cross shaft as claimed in claim 1, wherein each of said first and second seals consists of one of rubber and resin with no bar included.

3. The sealing structure for a cross shaft as claimed in claim 1, wherein said bases are pressed against each other in back-to-back contact and are each formed with knurls on a contact surface thereof.

* * * * *